US007684607B2

(12) United States Patent
Joshi et al.

(10) Patent No.: US 7,684,607 B2
(45) Date of Patent: Mar. 23, 2010

(54) FAKE CURRENCY DETECTOR USING VISUAL AND REFLECTIVE SPECTRAL RESPONSE

(75) Inventors: Murli Manohar Joshi, New Delhi (IN); Ram Prakash Bajpai, Chandigarh (IN); Gautum Mitra, Chandigarh (IN); Harish Kumar Sardana, Chandigarh (IN); Hari Narayan Bhargaw, Chandigarh (IN); Saroj Batra, Chandigarh (IN)

(73) Assignee: Council of Scientific & Industrial Research, New Delhi (IN)

( * ) Notice: Subject to any disclaimer, the term of this patent is extended or adjusted under 35 U.S.C. 154(b) by 1112 days.

(21) Appl. No.: 11/266,596

(22) Filed: Nov. 4, 2005

(65) Prior Publication Data

US 2006/0115139 A1 Jun. 1, 2006

Related U.S. Application Data

(63) Continuation of application No. 11/074,755, filed on Mar. 9, 2005, now abandoned.

(60) Provisional application No. 60/551,056, filed on Mar. 9, 2004.

(51) Int. Cl.
*G06K 9/00* (2006.01)
*B07C 5/00* (2006.01)
*G07D 7/00* (2006.01)

(52) U.S. Cl. .......................... 382/137; 382/135; 902/7; 209/534; 194/302

(58) Field of Classification Search ................. 382/135, 382/137; 902/7; 194/302; 209/534
See application file for complete search history.

(56) References Cited

U.S. PATENT DOCUMENTS

| | | | | |
|---|---|---|---|---|
| 4,311,914 | A * | 1/1982 | Huber | 382/112 |
| 4,542,829 | A * | 9/1985 | Emery et al. | 209/534 |
| 5,619,586 | A * | 4/1997 | Sibbald | 382/127 |
| 5,625,448 | A * | 4/1997 | Ranalli et al. | 356/71 |
| 5,737,418 | A * | 4/1998 | Saffari et al. | 713/176 |
| 5,909,503 | A * | 6/1999 | Graves et al. | 382/135 |
| 6,365,907 | B1 * | 4/2002 | Staub et al. | 250/566 |
| 6,381,354 | B1 * | 4/2002 | Mennie et al. | 382/135 |
| 6,483,576 | B1 * | 11/2002 | Gardner | 356/71 |
| 6,588,571 | B1 * | 7/2003 | Baudat | 194/328 |
| 6,748,102 | B2 * | 6/2004 | Prakash | 382/137 |

(Continued)

OTHER PUBLICATIONS

Wheeler et al. "Multiple Algorithms for Fraud Detection" Knowledge-Based Systems 13 (2000) pp. 93-99.*

*Primary Examiner*—Andrew W Johns
*Assistant Examiner*—Mia M Thomas
(74) *Attorney, Agent, or Firm*—Sughrue Mion, PLLC

(57) ABSTRACT

A system for automatic detection of authenticity of security documents by measuring reflected components of incident energy in three or more optical wave bands. The system involves the use of UV-visible light source, an optional near infra red light source, photodetectors and associated sensing circuitry. Photoelectric signals generated by photodetectors from the reflected energy received from a security document are used to verify its authenticity under UV-visible along with optional near infra red illumination. The process involves measurement of energy reflected as photoelectric signals from a security document in at least three optical wavebands by suitably located photodetectors with appropriate wave band filters and the electronic signal processing to distinguish between a genuine document from a fake one for ultimate LED indicator display and audio-visual alarms, hence the detection of fake security document.

40 Claims, 5 Drawing Sheets

System software flow chart $m$: no. of photodetectors (at least 3) ; $n$: no. of ratio normalised feature sets Flow chart for currency authentication

U.S. PATENT DOCUMENTS

| | | | | |
|---|---|---|---|---|
| 6,766,045 | B2 * | 7/2004 | Slepyan et al. | 382/135 |
| 6,798,900 | B1 * | 9/2004 | Sugata | 382/137 |
| 6,891,180 | B2 * | 5/2005 | Holl et al. | 250/556 |
| 6,899,215 | B2 * | 5/2005 | Baudat et al. | 194/328 |
| 6,902,105 | B2 * | 6/2005 | Koakutsu | 235/379 |
| 7,103,438 | B2 * | 9/2006 | Hallowell et al. | 700/116 |
| 7,167,247 | B2 * | 1/2007 | Uemura et al. | 356/432 |
| 7,209,582 | B2 * | 4/2007 | Takahashi | 382/136 |
| 7,266,231 | B2 * | 9/2007 | Christophersen et al. | 382/137 |
| 7,271,398 | B2 * | 9/2007 | Androsyuk et al. | 250/461.1 |
| 7,305,113 | B2 * | 12/2007 | Yoshida et al. | 382/135 |
| 2002/0064304 | A1 * | 5/2002 | Fuss et al. | 382/135 |
| 2002/0109830 | A1 * | 8/2002 | Liu | 356/71 |
| 2004/0187595 | A1 * | 9/2004 | Hibari | 73/800 |
| 2004/0211644 | A1 * | 10/2004 | Liu et al. | 194/207 |
| 2005/0060055 | A1 * | 3/2005 | Hallowell et al. | 700/95 |
| 2009/0152475 | A1 * | 6/2009 | Sasaki et al. | 250/492.1 |

* cited by examiner

Figure 1:
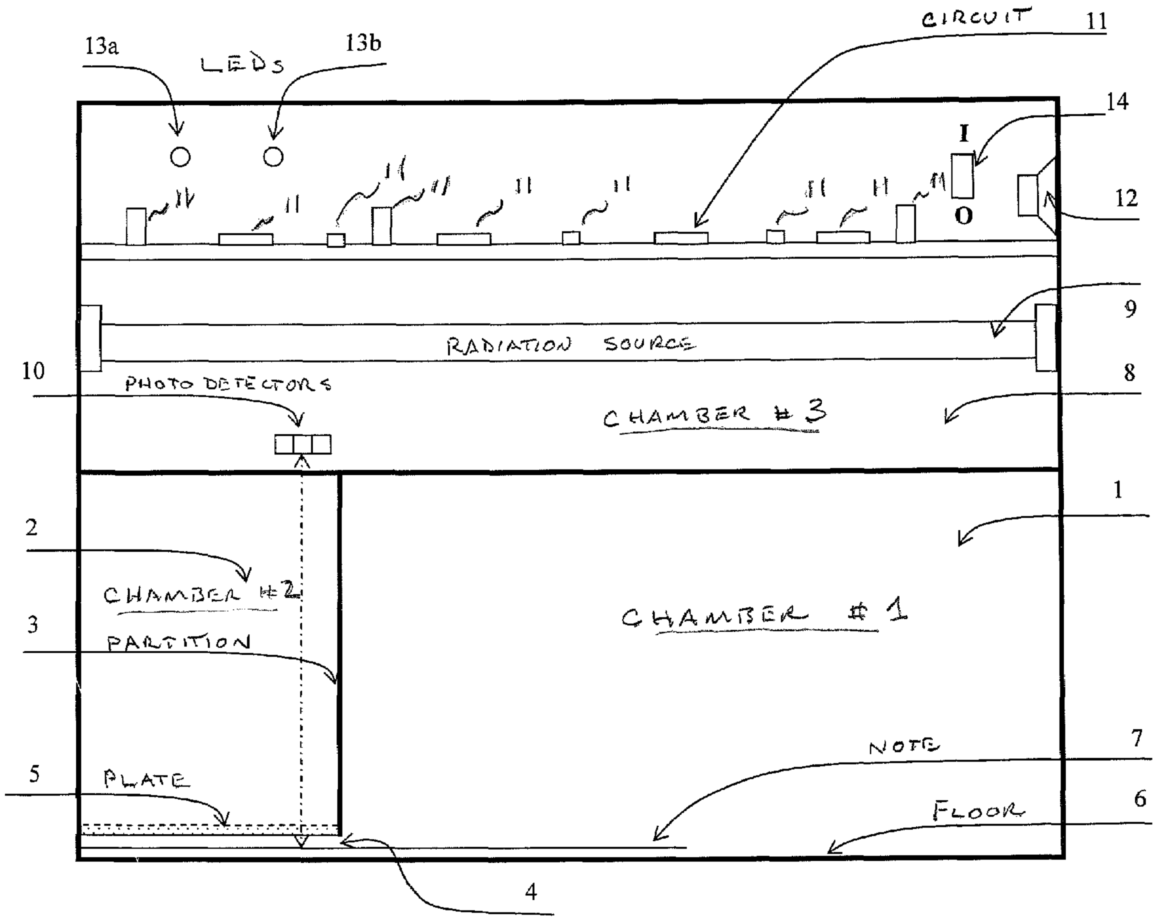

Figure 1: Overall block diagram of the system

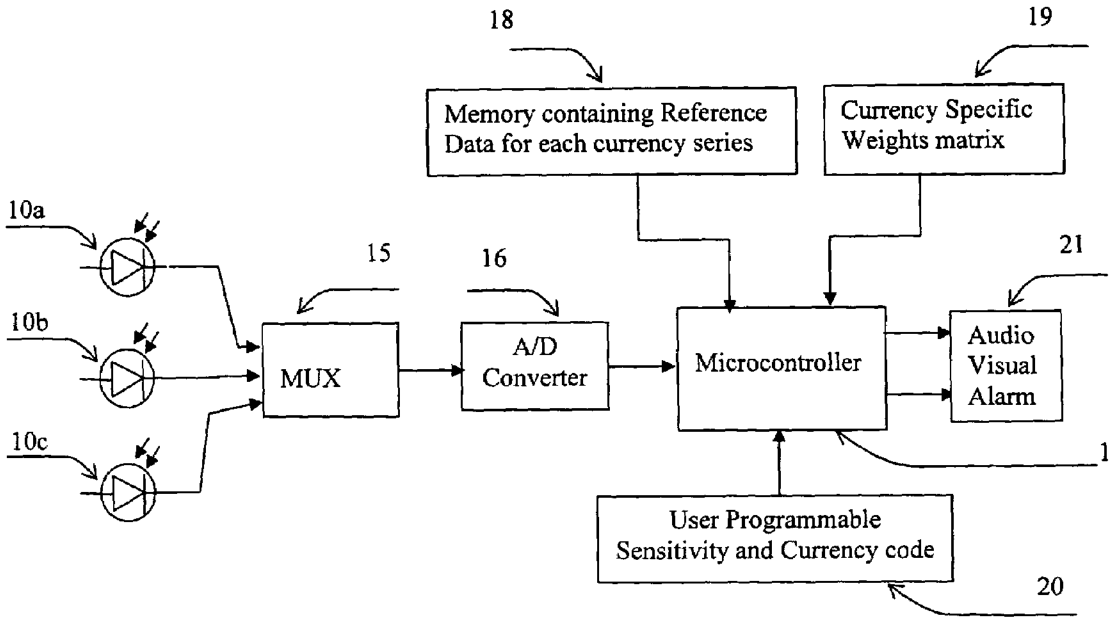
Figure 3: Block diagram of the Electronic sub-system

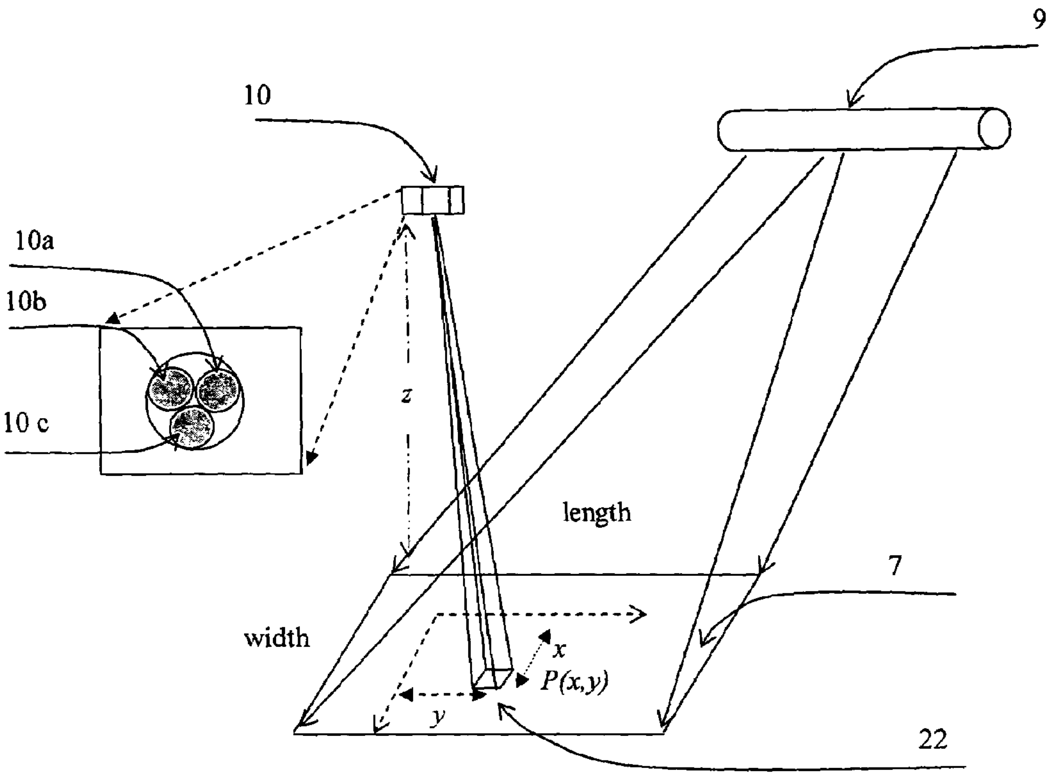
Figure 4: Ray Diagram (Schematic)

System software flow chart
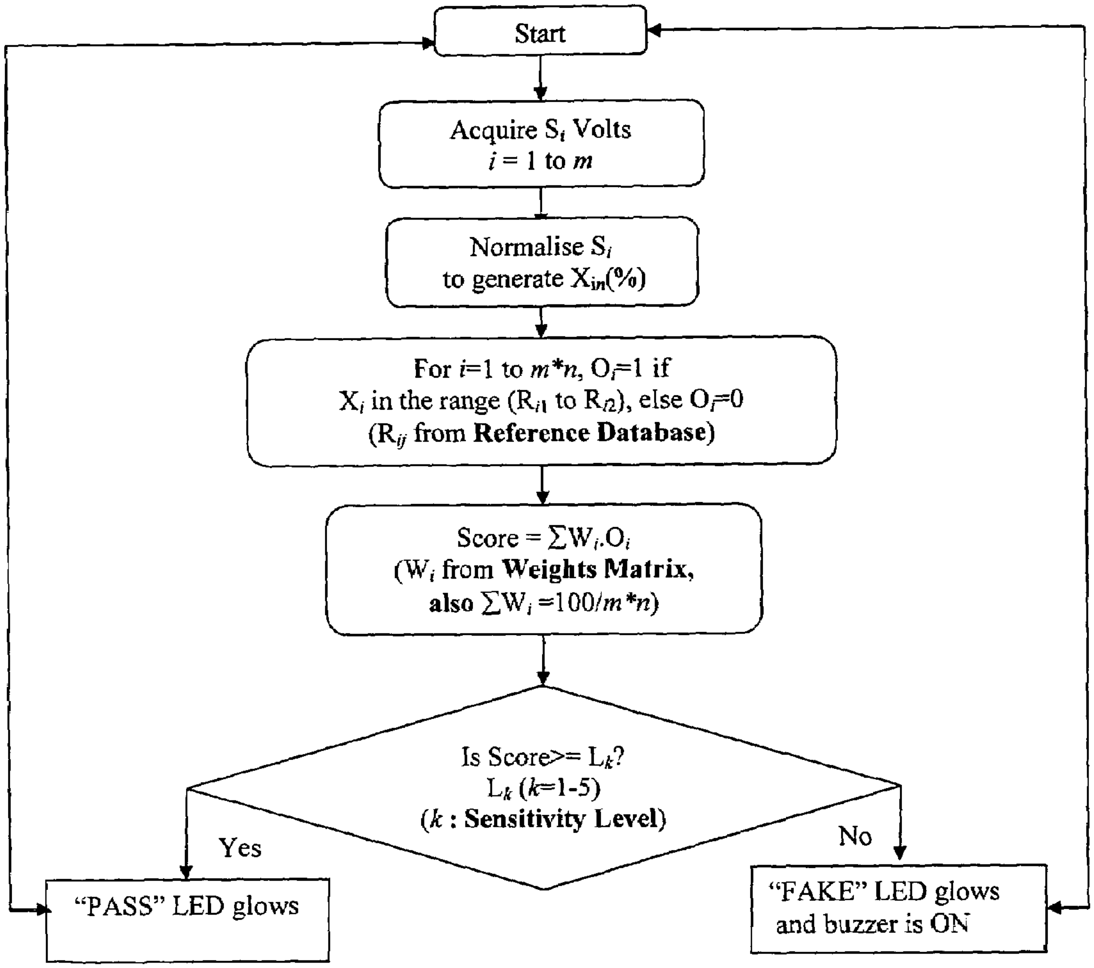
$m$: no. of photodetectors (at least 3) ; $n$: no. of ratio normalised feature sets
Figure 5: Flow chart for currency authentication

FAKE CURRENCY DETECTOR USING VISUAL AND REFLECTIVE SPECTRAL RESPONSE

This is a Continuation of application Ser. No. 11/074,755 filed Mar. 9, 2005, now abandoned which claims benefit of Provisional Application No. 60/551,056 filed Mar. 9, 2004. The entire disclosures of the prior applications are hereby incorporated by reference.

FIELD OF THE INVENTION

This invention relates to the development of an improved system for automatic detection of authenticity of security documents by measuring reflected components of incident energy in three or more optical wave bands. The system involves the use of UV-visible light source, an optional near infra red light source, photodetectors and associated sensing circuitry. The present invention relates to the use of photoelectric signal generated by photodetectors from the reflected energy received from a security document to verify its authenticity under UV-visible along with optional near infra red illumination. The process involves measurement of energy reflected as photoelectric signals from a security document in at least three optical wavebands by suitably located photodetectors with appropriate wave band filters and the electronic signal processing to distinguish between a genuine document from a fake one for ultimate LED indicator display and audio-visual alarms, hence the detection of fake security document.

BACKGROUND AND PRIOR ART TO THE INVENTION

All the prior arts describe systems for verification of currency notes claiming that the systems can be applied for other security documents also. Accordingly, in the following analysis of prior arts the word currency note is used rather than generic term security document. Presently available currency detectors can be classified into two categories, namely viewer type and automated type. All the viewer type instruments rely on subjective visual assessment of authenticity. Few of the viewers display a magnified view of micro-features under visible light. In some the viewers, a currency note is illuminated by UV light to display fluorescent security features like fibres, UV fluorescent printed pattern. Most automatic type detection systems are currency counters also. The verification in some automated type systems is based on UV measurement of fluoresced/reflected UV radiation from a narrow strip of the currency note; the data are collected by moving the note across a detector and measuring the energy from a small area at a time i.e. by scanning and sampling technique. The measured energy is converted into an electrical signal. Data acquired from a genuine currency notes is set as reference. Any deviation of the measured signal from this reference value is indicative of counterfeit. The few of the automatic verifiers measure reflected/fluoresced UV light from UV fluorescent security feature(s). Some currency verifiers are based on scanning a part of the printed pattern and looks for inconsistent locations of the small dots of the printing material. With the advent of technology, art of counterfeiting is also progressing rapidly. Earlier, fake currencies were produced either by colour scanning followed by high-resolution printing (alternatively colour photocopying) or by crude printing on non-security papers. The today's bank notes incorporate several security features like intaglio printing, optically variable ink (OVI) features, and UV fluorescent features including fluorescent fibres. Clever counterfeiters are now attempting to duplicate these features including fluorescent properties of the paper. A very thin line of demarcation now exits between a counterfeit currency note and an authentic one. At least two different modes of verification are imperative to assess the authenticity. The visual and UV fluorescent security features incorporated in a currency note vary from country to country and also denomination dependent. The judgement of authenticity of a currency note relying either on visual assessment or on rapid opto-electronic detection 'on-the-fly' technique based on scanning the light reflected or transmitted from a narrow zone may likely to yield misleading conclusions. A suitable apparatus providing the combination of integrated reflected as well as transmitted energy, received from a large area of a currency note, measurement facilities in at least three different wavebands both for the reflected and transmitted components, in static condition of the currency note, which can be adopted for the currencies from various countries of different denominations or in various physical conditions of the note to be inspected is not available.

Analysis of Prior Art

The following basic principles are used to verify the genuineness of a currency note:

- i Visually observing the UV fluorescent features, printed or embedded, of the currency note
- ii Reading the magnetically recorded code by a magnetic sensor
- iii Assessing the quality of print by studying the mis-registration
- iv Assessing the currency paper quality by measuring the quantum of UV light reflected/transmitted
- v Assessing the currency paper quality by measuring the quantum of UV light fluoresced
- vi Assessing a electronically recorded image
- vii Multifunctional apparatus for discrimination and authentication All the above cited prior arts rely on one of these principles—variations are in the techniques of data collection and the area of the currency note from where data are collected. The drawbacks of the prior arts are discussed below.

The paper used in currency notes has cotton based fibres as the base material that shows very little UV fluorescent property. Other types of paper convert incident UV radiation into visible light. The amount of UV light reflected and fluoresced are complimentary as higher is the quotient of fluorescence, less is the amount reflected and vice versa. So, the measurement one or the other provides similar information. Transmittance also depends on fluorescence since, if large fluorescence will reduce the transmitted components. Accordingly, principles mentioned under (iii) and (iv) above are some similar in nature, data interpretations. All the existing prior arts employing the principals (ii) and (iii) differ in the measurand, and technique of scanning and the zone of data acquisition. These have common limitations. The drawbacks of the all the prior arts are discussed below, apparatuses are classified in accordance with their principle of operation.

Visually Observing the Printed or Embedded UV Fluorescent Features

Prior arts listed in the U.S. Pat. No. 5,942,759 and US2001054644 belongs to this category. These are basically viewers where in the operator exposes the currency note to UV radiation and looks for the presence or absence of printed or embedded UV fluorescent features like serial no., floral or other patterns, thread and fibres etc. These instruments rely on two dimensional image capabilities of human eye and data processing power of the brain. Drawbacks are:

Decision is subjective and needs a priori knowledge about an authentic currency note identical in all respect, except physical conditions, to the one under verification.

It is practically impossible to stock standard samples either as images in the brain or physically corresponding currency notes of different denominations from various countries.

Modern counterfeits incorporate many UV fluorescent printed features to fool an operator relying on visual inspection only. Viewer types are not relevant to the present invention.

Magnetic Sensor Based Equipment

Prior arts listed in the U.S. Pat. No. 4,464,787 and U.S. Pat. No. 5,874,742 fall under this category. The drawbacks are:

Magnetic code readers are basically currency discriminators—magnetic code can be duplicated easily and hence not a reliable method of authentication Currency notes from many countries do not contain magnetic codes. Genuineness of currency notes from these countries can not be assessed.

Magnetic code of a currency note may be wiped out due to accidental exposure to strong magnetic field, magnetic sensor based instruments would fail to authenticate such a note.

Some machines scan the currency note to determine its dimensions for hence authentication. Dimensional data is unreliable.

These apparatuses are also not closest prior art.

Instruments Based on Assessing the Quality of Print by Studying the Mis-Registration Prior arts listed in the U.S. Pat. No. 4,482,971 belong to this category. Currency notes counterfeited by high resolution scanning and printing or colour photocopying process. The instruments scan and look for presence of small dots of printing ink inconsistent with the printed pattern. The main drawback is:

Modern counterfeited currency notes are printed in sophisticated notes duplicating most of the processes employed to print authentic currency notes without any discernable mis-registration error. These types of notes cannot be authenticated by studying the mis-registration error.

These apparatuses are also not closest prior art.

Instruments Based on of the Quantum of UV Light Fluoresced/Reflected/Transmitted Energy Measurement Prior arts listed in the U.S. Pat. No. 4,482,971 and FR2710998 belongs to this category. All of these scan a narrow zone, sampling a small area at a time, while the currency note moves below or over the photodetector. Measurand is either the reflected or transmitted or fluoresced component of incident UV light (there is only one patent, FR2710998, which measures transmitted energy and the rest measure the reflected energy). UV light is either blocked (fluorescent measurement) or rest of the optical spectrum is blocked only UV light is allowed to pass (UV reflectance/transmittance measurement) by a filter. The drawbacks are:

Measured fluoresced/reflected/transmitted energy data corresponding to UV region of the spectrum alone cannot reliably characterize the paper quality. Cleverly counterfeited currency notes can mimic UV fluoresce/reflection/transmission coefficient sufficiently close to that of a currency paper.

The source is kept very close to the moving currency note, so the data are collected from a very small area. The measured energy from each small sampled area is either compared to a reference data (collected from similar type authentic currency note) or summed up to compare with similar data collected from a reference sample. Soiling and or mutilations of the currency under authentication would cause substantial amount of data distortion to reliably assess authentication.

It is known that an accidentally washed genuine note in certain detergent develops UV fluorescent quality. Such a note would be indicated as a counterfeit.

This principle needs motion of the currency note, and performs only first order verification during stacking/counting of unsoiled notes of similar type. It is not a compact and cheap system.

Some apparatuses measure the fluorescent energy emanated from certain printed features, e.g. thread. These need accurate placement of the said feature(s) under the photodetector. Since currency notes of different denominations from different countries contain UV sensitive features at different locations, instruments based on measuring UV fluorescence (by any printed pattern) can be usefully employed for US Dollars only, as all US Dollars have same size and are reasonably similar.

There is only one U.S. Pat. No. 4,618,257 which uses multiple sources emitting different waveband to illuminate a very small zone of the currency note under verification and a single detector collects the energy for each waveband in sequential manner. Since the data corresponds to a small zone, local physical condition, like soiling, mutilation etc. would severely affect the proper authentication process.

Assessing a Electronically Recorded Image

The patent US20030169415 uses a CCD camera to record the image and by tri-chromatic colour analysis technique judges the authenticity. The drawbacks are:

Soiling, mutilation, physical damage etc. would lead to erroneous results

Expensive and complex

Basically designed for passport and similar kinds of documents.

Multifunctional Apparatus for Discrimination and Authentication

US20030081824A1, claims for an improved fake currency detector using different kinds of sensor output. A brief description of is principle of operation and drawbacks are given below:

A multifunctional apparatus is using multiple magnetic and optical sensors. The magnetic sensors scan and generate a magnetic code. Optical sensors scan the currency note in terms reflected energy in two wave bands. Colour matching scheme is also has been claimed to be employed. The two types filters used are used, namely UV pass and UV blocking. UV blocking visible pass filter is made a combination of two filters namely a blue filter passing 320 nm to 620 nm with a peak at 450 nm and a yellow filter passing 415 to 2800 nm. So, the visible light sensor sees 415 nm to 620 nm i.e. it senses blue to a small part of red colour.

The drawbacks are:

Authentication is largely dependent on magnetic and optical scanning. Currency notes of many countries do not have any magnetic code.

In many countries, old notes have threads which do not contain any special optical feature. Such notes would be identified as fake, even if genuine.

The optical authentication is based on thread parameters. Currency notes of many countries, including India, have different series of same denomination with a wide variation in thread locations. The tolerance limit of 0.05 inch permissible in the patent application would reject authentic currency notes.

A genuine note accidentally discoloured due to bleaching etc. would be indicated as fake.

The principle used can not properly authenticate genuine currency notes having no fluorescence feature (text or thread), such as Asoka pillar Indian currency series of Rs.50 and Rs.100 denomination notes, still in wide circulation in India.

The optical authentication is based on printed image pattern and thread data. Clever counterfeiter can duplicate printed patterns.

The apparatus can not detect NIR sensitive features likely to incorporate in the currency notes of various countries.

The apparatus is complex, expensive and not portable.

Another prior art U.S. Pat. No. 4,618,257 incorporates two LEDs positioned at such angles that they illuminate a common target area and a broad band photo detector to measure the light reflected from the target area. As the currency note is transported under the LEDs, each of the LEDs is switched on sequentially with a pre-determined 'on-time' and 'delay time'. The preferred LED pair is comprised of one narrow band red LED and the other narrow band green LED having peak emission wavelengths of 630 nm and 560 nm respectively. The patent suggests the alternative use of yellow or infrared LED. The measured signals in terms of voltages are compared with the corresponding reference values stored in a memory. The drawbacks of this apparatus are:

It does not collect any data corresponding to the reflectance or fluorescence of UV or blue colour. Reflectance information is confined to only about half of the optical spectral range of 350 to 750 nm. Our experiment has shown, as explained later in Example 1, that UV-blue reflectance property of a currency note is a strong indicator of its genuineness due to the very basic nature of the currency paper.

Due to various reasons including local conditions of a currency note, reflected data from a small area may not be the true representative of the bulk properties.

The apparatus collects data from a specified small target area making it highly position sensitive particularly in case of currency notes of varied sizes.

All known automated currency verifiers require transport mechanism, and cannot operate in stationary condition of the document under verification. These verifiers pick up one document from a stack of multiple number of similar documents, transport it from one place to other and verify authenticity on the fly by scanning it. Such systems are suitable basically for currency note with a number of currency notes stacked in a pile, but can not properly handle one off a kind documents like bank draft, security bond and other bank instruments where each document is likely very different from the other in shape, size and other similar parameters. There is no patent sealed or filed till date wherein one off a kind documents like, bank drafts, security bonds and other bank instruments and security documents which require manual feeding can be authenticated by a unique automatic detection mode.

There is no patent sealed or filed till date, which embodies automatic opto-electronic detection techniques using at least three optical wavebands to generate reflectance/fluorescence data by measuring reflected/fluoresced energy together with a provision visual inspection under UV-visible-near infra red light.

There is no patent sealed or filed till date, which embodies automatic opto-electronic detection technique using more than one optical wavebands to obtain reflectance/fluorescence data by spatially integrating energy received from a large area of the document under verification.

There is no known prior art claiming to authenticate polymer based currency notes, passport, visa, various bank instruments visually as well as automatically.

The present invention circumvents the drawbacks of existing prior arts by providing two independent methods of verification and more than one optical band to detect authenticity in automatic mode in a stationary condition of the document under authentication by performing large area spatial and temporal integrations simultaneously. However, the automatic detection module of the invention can be adopted in a currency note counting machine by collecting dynamic data at various scanning points. The present invention provides an apparatus that can be used to authenticate paper and polymer based currency note, bank drafts, security bonds and other bank instruments and security documents without any need to modify system hardware.

OBJECTS OF THE INVENTION

The main object of the present invention is to provide an improved system for detecting the authenticity of paper and polymer based currency notes, bank drafts, security bonds and other bank instruments and security documents.

Another object of the present invention is to provide a system capable of automatic detection of authenticity of documents like, bank drafts, security bonds and other bank instruments and security documents which can not be stacked in number and transported one at a time, but needs to be verified under stationary condition.

One more objective of the present invention is provide a system wherein hidden security features which can be seen only when irradiated by UV and near infra red light can be observed.

Another object of the present invention is to provide a system incorporating at least three different optical broad band filters to pass three or more optical wavebands for reflectance/fluorescent measurements.

Another object of the present invention is to provide a system capable of automatic detection of authenticity by performing spatial integration reflected/fluoresced energy from a large surface area of the document under verification in three or more optical wave bands covering UV-visible spectrum—near infra red part of spectrum.

One more object of the present invention is to provide a system capable storing reference information by storing the measured reflection and fluorescent/reflected data in the system memory.

Still one more objective of the present invention is to provide a system capable of suitably normalising the acquired measured values corresponding to authentic documents and store the values in system memory.

Still one more object of the present invention is to provide a system wherein the reference information for each document type is assigned a unique specific code.

Yet one more object of the present invention is to provide a system wherein updating of stored data base of reference information tagged by suitable document specific codes can be updated and enhanced.

Yet one more object of the present invention is to provide a system capable of storing a currency specific weight matrix in the firmware so as to obtain a minimum false rate.

One more object of the present invention is to provide a system capable of automatic detection of authenticity by deriving a set of ratios from the measured reflection/fluorescence data corresponding to the document under verification to form a set of reference for comparison with the corresponding stored values in system memory.

One more object of the present invention is to provide a system capable of automatic detection of authenticity by multiplying the derived ratios with the suitable weights stored in system memory.

Still one more object of the present invention is to provide a system capable of automatic detection of authenticity by incorporating a microcontroller and a firmware to logically derive a figure of merit to define authenticity or fakeness from comparison of weighted ratios derived from the measured data for the document under inspection with the corresponding reference values.

Still another object of the present invention is to provide a system capable of automatic detection of authenticity with a provision of operator selectable sensitivity level.

Still another object of the present invention is to provide a system capable of automatic detection of authenticity with a provision of entering document specific code so that corresponding reference information is used to compare with measured and weighted ratios to objectively assess the authenticity.

Yet one more object of the present invention is to provide a system capable of automatic detection with provision for acquiring reflected/fluoresced information from the document under verification in near infra red region of the spectrum.

Still one more object of the present invention is to provide a system capable of automatic detection of authenticity by incorporating self calibrating mechanism to off set temporal and diurnal variations of electro-optic subsystem out put caused by circuit noise and light source fluctuations.

Still another object of the present invention is to provide automatic detection system insensitive to short term thermal drifts and the others due to ageing and replacement of UV visible light source, accumulation of dust and variation due to power.

Yet another object of the present invention is to provide a system with detection capability for a plurality of bank drafts, security bonds and other bank instruments and security documents.

Yet one more object of the invention is providing a system for not identifying a mutilated/damaged currency notes as fake.

Still one more object of the invention is to provide a system for not mis-identifying genuine paper and polymer based currency notes, due to accidentally (e.g. washing) acquiring similar reflective/fluorescent properties of a fake note.

Still another object of the present invention is to use of standard UV fluorescent tube light, emitting 350 nm to red end of electromagnetic spectrum of size varying from 150 mm to 350 mm (tube length) and of any wattage varying from 7 W to 15 W.

Still another object of the present invention is to use of another light source, emitting near infra red part of electromagnetic spectrum.

Another object of the present invention is to provide a system with adequate distance between the said light sources and the document under inspection such that the entire document illuminated brightly and evenly during reflectance/fluorescence measurements.

One more object of the present invention is to provide a system with adequate distance between the said photodetectors and the document under inspection such that reflected/fluoresced energy from a very large area of the document under authentication reaches each photodetector.

Another object of the present invention is to provide provision of inclusion of at least three optical band pass filters of desired spectral transmitting characteristics in front of the photodetectors.

Still one more objective of the present invention is provide a system incorporating a one surface ground optical glass plate for holding the document under verification in place in a wrinkle free condition.

Still one more objective of the present invention wherein surface facing the photodetectors meant for reflection of each glass plate is ground to facilitate spatial integration.

Still another object of the present invention is to provide a system capable of indicating the authenticity of a security document by making a LED marked "PASS" glow in case the document is genuine.

Yet another object of the present invention is to provide a system capable of indicating the authenticity of a security document by making a LED marked "FAKE" glow and triggering an audio alarm in case the document is a counterfeit.

SUMMARY OF THE INVENTION

A currency genuineness detection system using plurality of opto-electronic sensors with reflective (including fluorescence) properties of currency paper is developed. Both detection sensing strategies utilise integrated response of the wide optical band sensed under UV visible light illumination. A currency note is examined under static condition. A window signal signature is thus possible from detectors for every security document. A programmable technique for checking the genuineness of a currency note is possible by feeding a unique code of the document under examination.

BRIEF DESCRIPTION OF THE ACCOMPANYING DRAWINGS

In the drawings following the specification,

FIG. 1: Design showing both fluorescence and reflection properties sensing of authenticity of security documents.

Figure 2:
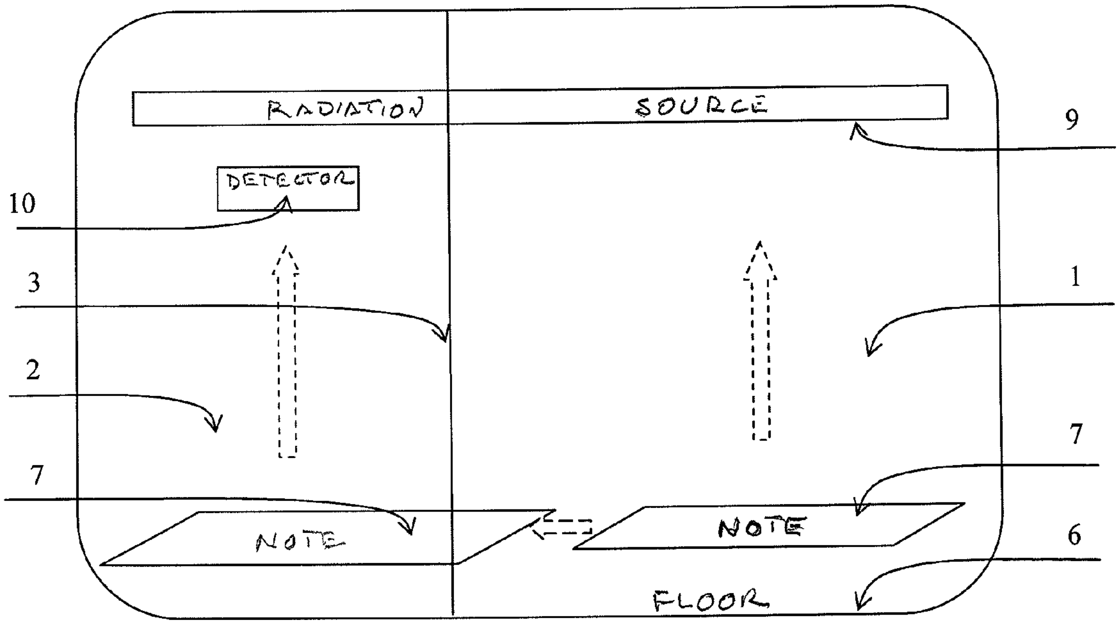

FIG. 2: Overall block diagram of the system.

FIG. 3: Block diagram of the electronic sub-system

FIG. 4: Ray diagram (Schematic)

FIG. 5: Flow-chart for authentication

DETAILED DESCRIPTION OF THE INVENTION

The present invention involves the development of an improved Fake Currency Detector using visual and automated spatially integrated reflective spectral response in more at least three optical wavebands. Security documents of various kinds like, currency notes, bank instruments, passport, visa, security bonds etc. can be authenticated by the present invention. However, for brevity, the words currency note are used in following description and these words by no means restrict the applicability of the system. A genuine note can acquire UV fluorescent properties accidentally; conversely, a counterfeit note may not have UV non-fluorescent properties of a genuine note. The present invention acquires reflectance/fluorescent data covering the entire UV visible spectrum by splitting into three wavebands simultaneously from a large area of a currency note. This involves the assembly of different sub-systems in compact a small sized chassis. FIG. 1 shows the block diagram of the invention, which comprises of three chambers, 1, 2 and 3. The first open chamber 1 has sufficiently large floor area to accommodate all sizes of currency notes for visual inspection under UV-visible illumination. The second closed chamber 2, serves as a built in dark room. This chamber is covered in the front and is isolated by a partition 3, from 1 to baffle stray light. There is a small clearance 4, between the inside floor and a plate made of BK7 glass or equivalent 5, whose top side is ground, mounted above the floor 6, to facilitate insertion of a currency note 7, by sliding. The ground surface of 5 spatially integrates both incident and reflected light. The third chamber 8, houses a standard UV fluorescent tube 9 light of length varying from 150 mm to 350 mm, and an optional compact near infra red source (not shown), three standard photodetectors, 10*a*, 10*b*, 10*c*, capable of sensing 350 nm to 1100 nm and built-in amplification, (for example UDT455HS) each with a different optical broad band pass filter, processing electronic circuitry 11, and a small speaker 12, for audible alarm. The chamber 8 is completely enclosed and not to be approached except in the cases of tube or photodetector replacement or repair. The source(s) 9 emits radiation from about 340 nm to near infra red end of visible spectrum. The photodetectors 10 and source(s) 9 are located at convenient height that the entire area of a currency note 7, inserted inside chamber 2, is well illuminated and also reflected/fluoresced light from the entire area reaches to photodetectors 10. Two LEDs, 13*a* and 13*b*, one green and other red, are mounted on the front covered part of the apparatus. A single switch 14 is provided to switch on power supplies to parts 9, 10 and 11.

The schematic of operation is shown in FIG. 2. A currency note 7, is first examined manually under UV source 9 inside chamber 1. For automatic objective assessment, it is slid inside chamber 2 through the small clearance 4. In the absence of currency note 7, photodetectors 10 receive scattered signal from the walls and floor of the chamber 2. Under this condition, the LEDs 13*a* and 13*b* remain off. For inspection, a currency note 7 is placed on floor of chamber 1. The light source(s) 9 illuminates the entire surface of the floor 6 and makes it amenable for inspection of fluorescent security features as well as other security features like portrait, denomination mark, and quality of printing ink and thread which can be seen under visible light. For automatic detection, the currency note 7 is gently slid along the floor through the clearance 4 to place a part of the note 7 inside chamber 2. The note 7 is slid till its edge touches the rear inner wall of the chamber 2. Under this condition photodetectors 10 receive reflected and scattered UV-visible radiation from the UV source 7. Depending upon the authenticity, either the green LED 13*a* glows or the red LED 13*b* glows and the audio alarm 12, is triggered. The glowing of 13*a* indicates that the currency note under inspection is authentic while glowing of 13*b* along with audible alarm indicates counterfeit note.

FIG. 3 shows the block diagram of the electronic subsystem. As mentioned earlier, photodetectors 10 generate three analog signals. A multiplexer 15 and A/D converter 16 combination lets a microcontroller 17 sample all these signals acquired for further processing. These are normalized for reliable authentication as explained later. Reference data generated from various currency notes is stored in a memory unit 18 as firmware for authentication. In addition, country and currency specific weights form another firmware 19. The user has a provision for programmable sensitivity control and the desired currency code through a key pad 20 (not shown). In operation, audiovisual alarms provide the result of authentication. The following is mathematical analysis of working of the present invention. FIG. 4 illustrates the working principle of the invention. When a currency note 7 is placed under a broad source of light 9 every point on it receives incidence radiation from different source points at different angles. Any point on the active area of a photodetectors 10*a*, 10*b*, 10*c*, placed at height z would receive reflected light flux dF corresponding to a waveband of dλ from an elementary area dx.dy 22, of the currency note 7 given by the following equation:

$$dF\alpha k(\lambda).\{r_{\lambda,x,y}b(\lambda,x,y)/(x^2+y^2+z^2)\}d\lambda dxdy \quad (1)$$

and the photodetector would generate an electrical signal $dS_\lambda$ given by:

$$dS_\lambda=k(\lambda).\{r_{\lambda,x,y}\,b(\lambda,x,y)/(x^2+y^2+z^2)\}.d\lambda.dx.dy \quad (2)$$

where, k(λ): a wavelength dependent constant of proportionality indicating energy conversion efficiency of the photodetector and filter combine $r_{\lambda,x,y}$: reflectance corresponding to wavelength λ at x, y b(λ, x, y): incident energy—depends upon the source type and its location x, y: coordinates of the centre point of the elementary area taking the foot of the normal drawn from the detector surface to the plane of currency note as the origin.

The electrical signal generated by a point on the detector surface corresponding to waveband of $(\lambda_2-\lambda_2)$ is given by, $$S=\iiint k(\lambda).\{r_{\lambda,x,y}\,b(\lambda,x,y)/(x^2+y^2+z^2)\}d\lambda dxdy \quad (3)$$

The inner integration is performed over the waveband while two outer integrals correspond to the area viewed by the photodetector 10 when a currency note is placed inside the built in dark chamber of the present invention. Equation (1) gives signal generated by a point on the photodetector 10. Actual signal measured would be sum the signals of all points on the active area of the photodetector 10. It would enhance the signal level only—so, for brevity, not shown in the equation.

The non-uniform illumination term b(λ, x, y) remains reasonably high within the limits of the integration, if the angles subtended by the extreme points of the source are not large at any point of the part of the currency note under inspection. In the present invention this achieved by not keeping the broad source close to the currency note. $r_{\lambda,x,y}$ is the average value of reflectance over the waveband and is also a function of local conditions like soiling/mutilation and the type and amount of printed matter. In the distance range of 50 to 100 mm a large area of the currency note 7 would contribute significant amount of light flux. The process of spatial integration reduces the effect of abnormality in data, due to local perturbations, to a no significant level. Consequently, the measured signal S is truly indicative of the average reflectance of the note 7, corresponding to the selected wavebands.

In the present invention photodetectors 10*a*, 10*b* and 10*c* each coupled with a specific optical band pass wavelength filter, simultaneously and independently measure spectral reflectance in the three selected optical wave bands. Signals $S_1$, $S_2$, S3 from each photodetector 10 are given by, $$S_1=\iiint k(\lambda)\{r_{\lambda,1,x,y}\,b(\lambda,x,y)/(x^2+y^2+z^2)\}d\lambda dxdy \quad (4a)$$

$$S_2=\iiint k(\lambda)\{r_{\lambda,2,x,y}\,b(\lambda,x,y)/(x^2+y^2+z^2)\}d\lambda dxdy \quad (4b)$$

$$S_3=\iiint k(\lambda)\{r_{\lambda,3,x,y}\,b(\lambda,x,y)/(x^2+y^2+z^2)\}d\lambda dxdy \quad (4c)$$

Where, $r_{\lambda,1,x,y}$, $r_{\lambda,2,x,y}$, $r_{\lambda,3,x,y}$ are the average values corresponding to the three optical filters.

The unit-less voltage ratios $S_1/(S_1+S_2+S_3)$, $S_2/(S_1+S_2+S_3)$, $S_3(S_1+S_2+S_3)$ $S_1/S_2$, $S_1/S_3$, $S_2$/S3, and many similar algebraic variants (using viz. squares of various voltages) form feature sets that characterize the currency note in terms of its reflective properties in three wavebands. These data would uniquely define the currency note of any denomination from any country and efficiently distinguish between the genuine and fake. For experiments conducted, chosen wavebands were UV blue, yellow and red and corresponding ratios (percentages) of the individual to total response were computed.

FIG. 5 shows the system software flow-chart. Omitting the usual diagnostics at power-on and a user selection of the currency under examination, a stage is reached where the system is in operation and examining the currency of interest with appropriate code of the currency. With this information, it is in detection mode. In this mode, the microcontroller 17 instructs the multiplexer 15 for scanning three inputs which are converted into digital form by the ADC 16. The voltage readings are normalised by ratios suggested later in Equation 4a, b and c to form various percentages. Various sets (=n) can be formed depending upon the choice of features to be used. In this manner, since there are three bands (m=3), we get a maximum of 3n normalised features ($X_i$ in percentage form) to be used for detection. Our data in various tables given later shows only a single normalisation (n=1) with various colour band readings normalised to the total of the three readings. The next step provides various outputs ($O_i$=1 or 0) for each of these feature values using Reference Database 18. The results so obtained are weighted as per the Weight Matrix 19 suited for a series of currency to generate a score value to provide minimum errors of detection. Finally, a user selectable Sensitivity level 20 is provided for acceptability of the detection. Using these levels, a strict or loose score is used to detect the genuineness and accordingly audio-visual alarm 21 is set for "Pass" or "Fake" situation. In either case, the loop continues to sense the presence of note and accordingly generate the genuineness result.

Accordingly, the present invention provides a system for automatic sensing authenticity of security documents like paper and polymer based security documents, various bank instruments etc., the said system comprising a UV visible source, an optional compact near infra red source; a closed chamber for automatic detection of authenticity, one surface ground parallel glass plate for suitably holding the document during verification process; multiple broad band pass optical filters and photodetectors; opto-electronic signal acquisition, conditioning and processing circuitry; a microcontroller and a firmware to logically indicate whether the document under verification is genuine or fake based on normalised weighted acquired reflection data and stored reference; human interface with the microcontroller and system memory to enter desired sensitivity level, document code, reference data, weight matrix etc.; LED displays and audio alarm.

In another embodiment of the present invention, an objective measurement of reflecting properties of security documents simultaneously is possible in a closed opto-electronic sensing chamber by sliding the document to be authenticated gently to generate quantitative signal level for audio-visual alarm/display indicating whether the document is genuine or fake.

In another embodiment of the present invention, broad band multi-spectral reflectance signatures are used to uniquely identify, in terms of authenticity, the document under verification.

In another embodiment of the present invention, the system can be used for automatic detection of authenticity by characterising a security document in terms of spectral reflection/fluorescence properties in at least three wavebands covering UV visible and near infra red spectrum.

In another embodiment of the present invention, the system can be used for automatic detection of authenticity by comparing normalised and weighted spectral signatures in the selected wave bands to the corresponding reference signatures stored in the system memory. In still one more embodiment of the present invention, spectral signature corresponding to each optical band is measured by spatially integrating the reflected/fluoresced light coming from a large surface area of the document under verification at the same time performing integration over spectral band width of corresponding filter.

In yet another embodiment of the present invention, spectral range of reflectance measurements cover UV-visible-near infrared region of electromagnetic spectrum.

Still one more embodiment of the present invention, single document can be handled at a time, it need not be stacked with multiple documents of the same or different kind.

In yet one another embodiment of the present invention, the document is gently slid in the system where one set of photodetectors with each with different waveband filters, above the document under verification to measure reflecting/fluorescing properties under UV-visible-near infra red illumination.

In one more embodiment of the present invention, the document is kept stationary during authentication process.

In still another embodiment of the present invention, the light sources are so positioned that entire surface area of the document is brightly and uniformly illuminated.

In still another embodiment of the present invention, reflected/fluoresced light from a very large area of the document surface is collected simultaneously keeping the document stationary.

In still one more embodiment of the present invention, spectral signature corresponding to each optical band is measured by spatially integrating the reflected/fluoresced light coming from a large surface area of the document under verification at the same time performing integration over the spectral band width of the corresponding filter.

In yet another embodiment of the present invention, any kind of security document can be fed to the system for verification in any order or sequence.

In still one more embodiment of the present invention, the system does need the scanning or transportation during measurement process which is not desirable for, in certain applications where multiple documents are not required to be verified, e.g. bank draft, bank cheque and other bank security instruments.

In another embodiment of the present invention, based on the reflected data collected from a security document, it is possible to set multiple quantitative signal levels, to define authenticity depending upon the country of origin, type and kind of document and appropriate weighted logic can be employed to judge the authenticity.

In yet another embodiment of the present invention, the photodetectors used for automatic sensing of reflection properties are so located that each photodetector receives reflected light from at least about half the area of the document under verification.

In still another embodiment of the present invention, the system incorporates a microcontroller and necessary signal acquiring, conditioning, processing, display and audio alarm electronics circuitry.

In another embodiment of the present invention, measured reflected/fluoresced from a genuine document is suitably normalised to form a set of ratios and stored in the system memory.

In another embodiment of the present invention, suitably normalised measured reflected/fluoresced from a genuine document stored in the system memory is tagged by a document specific code.

In still one more embodiment of the present invention, the document specific codes and corresponding reference values can be entered in system memory to create or upgrade reference data base either at the factory level or user's premises.

In yet one more embodiment of the present invention, a weight matrix is stored in system memory to generate suitably weighted normalised reflection/fluorescence data both for stored reference values and values acquired from the document under verification.

In still one more embodiment of the present invention, the weight matrix can be entered in system memory to create or upgrade reference data base either at the factory level or user's premises.

In yet another embodiment of the present invention, user can enter the desired sensitivity depending upon the physical conditions, aging and value of the document under verification.

In another embodiment of the present invention, a firmware derives a single figure of merit based on the chosen sensitivity, the stored reference, measured data and assigned weights following a logical sequence.

In yet one more embodiment of the present invention, the derived figure of merit is used to take decision regarding the authenticity of the document.

In yet one more embodiment of the present invention, LEDs, one marked "PASS" and the other marked "FAKE" are fitted to display decision regarding authenticity.

In another embodiment of the present invention, depending upon whether the document under verification is genuine or counterfeit, the respective LED glows.

In still one more embodiment of the present invention, an audio alarm is triggered when the security document under verification is fake.

In yet another embodiment of the present invention, the photodetectors used for automatic sensing of fluorescence and reflection properties of a document have the performance characteristics covering a spectral band of 350 nm to 700 nm and optionally 350 nm to 1500 nm.

In still one more embodiment of the present invention, is to provide a system capable self calibrating mechanism to off set temporal and diurnal variations of electro-optic subsystem out put caused by circuit noise and light source fluctuations.

Still another object of the present invention is to provide automatic detection system electronically made insensitive to short term thermal drifts and the others due to ageing and replacement of UV visible light source, accumulation of dust and variation due to power. In one more embodiment of the present invention, more than one types of document can be tested for authenticity.

In one more embodiment of the present invention, more than one country's documents can be tested for authenticity.

Having given the principle of the currency sensing automatically, we now provide the schematic design of the system which allows genuine currency paper's properties to be used for testing its authenticity.

The special characteristics of the instrument and where it can be used are as follows:

A system useful for sensing currency detection automatically.

A system claimed herein wherein a set of optoelectronic sensors are used and integrated response under UV and near infra red light is used A system useful for testing multiple countries' currency in a programmed manner based on quantitative measurement of reflective and fluorescence properties for automatic detection. A system allowing standard photo detectors to be used.

The invention is described in detail in the examples given below which are provided by way of illustration and therefore should not be considered to limit the present invention in any manner.

EXAMPLE 1

For experimental testing of the proposed apparatus, a fake Indian currency note of denomination value 'A' was checked under automatic detection mode. Table I shows, that the yellow and red band readings of the fake note were within the acceptable range, showing the note as genuine. However, blue band readings of the fake note clearly identified it to be fake. Visual assessment under UV light could not confirm its status as it was showing most fluorescence security features.

EXAMPLE 2

For experimental testing of the proposed apparatus, a fake Indian currency note of denomination value 'B' was checked under automatic detection mode. Table II shows that the blue and yellow band readings were out of the permissible range, while red band indicated genuineness. Visual assessment under UV light could not confirm its status as it was showing most fluorescence security features. The experiment shows that confirmation of at least two out of three readings is essential for currency verification particularly for cleverly counterfeit notes incorporating all UV visible security features.

EXAMPLE 3

For experimental testing of apparatus, a number of genuine Indian currency notes of denomination 'A', 'B', 'C' under moderate usage were verified. The results show that the "⅔ rule of acceptance" using the reference data given in Table I-III, identified all the notes as genuine. Visual inspection also confirmed the results.

EXAMPLE 4

For experimental testing of apparatus, a moderately used genuine Indian currency note of denomination 'A' Series-2, was subjected to application of a commercial detergent. The same note was inspected for its authenticity. The measured blue, red and yellow wave band readings were 14.7%, 41.035% and 44.265%. From Table I, it can be seen that the blue band readings was beyond the permissible range while the other two were within the permissible range. It shows that "⅔ rule of acceptance" of the apparatus identifies a genuine currency note as genuine even though it had accidentally acquired UV fluorescent properties of a fake currency note.

EXAMPLE 5

For experimental testing of apparatus, five soiled but genuine Indian currency notes of denomination 'A' were tested for their responses in three wave bands. The notes were then thoroughly cleaned by laboratory grade alcohol. The wave band responses of the cleaned notes were measured with those of the unsoiled conditions. It was found that the readings did not vary much. This shows that the instrument is insensitive to the physical conditions of the note.

EXAMPLE 6

The invented technique can be extended to the polymer based currency without any need to modify the apparatus. For experimental testing of the proposed apparatus, polymer based currency notes of three countries were used, taking two currency notes of same denomination from each country. For an elaborate judgement, both sides of both notes were used for checking the suitability of the apparatus in different conditions. Table IV shows all (yellow, red and blue) bands of reflection readings. In different rows, the readings are very close to indicate that different notes provide a repeatable evidence for checking genuineness.

TABLE I

| Currency Description | | Denomination 'A' Notes Blue % | Red % | Yellow % |
|---|---|---|---|---|
| Den. 'A' Series-1, Normal | AVG | 13.07674943 | 44.04969286 | 42.87355771 |
| | RANGE | 11.909-14.040 | 40.846-47.109 | 40.379-47.244 |
| Den. 'A' Series-1, | AVG | 13.01106581 | 41.40943506 | 45.57949913 |
| Soiled | RANGE | 11.986-13.985 | 39.631-43.613 | 43.75-47.811 |
| Den. 'A' Series-2, New | AVG | 12.29278794 | 42.30355221 | 45.40365985 |
| | RANGE | 12.163-12.400 | 40.273-43.810 | 44.025-47.326 |
| Den. 'A' Series-2, Fake | | 14.6811071 | 40.79422383 | 44.52466907 |

TABLE II

| Currency Description | | Denomination 'B' Notes Blue % | Red % | Yellow % |
|---|---|---|---|---|
| Den. 'B' Series-1, New | AVG | 14.92040844 | 42.18685645 | 42.89273511 |
| | RANGE | 14.242-15.598 | 41.077-43.269 | 41.132-43.907 |
| Den. 'B' Series-2, Normal | AVG | 13.73324884 | 41.42489876 | 44.8418524 |
| | RANGE | 13.326-14.402 | 40.040-43.460 | 42.957-47.964 |
| Den. 'B' Series-2, Soiled | AVG | 12.68311827 | 41.32135983 | 45.9955219 |
| | RANGE | 12.26-12.941 | 40.423-41.855 | 45.540-46.659 |
| Den. 'B' Series-2, Fake | | 14.19676214 | 40.59775841 | 45.20547945 |

TABLE III

| Currency Description | | Denomination 'C' Notes Blue % | Red % | Yellow % |
|---|---|---|---|---|
| Den. 'C' Series-1, New | AVG | 12.27483574 | 42.48533549 | 45.23982877 |
| | RANGE | 11.048-13.347 | 39.925-44.718 | 42.843-45.986 |

"Series" denotes print Series and New/Normal/Soiled denotes physical conditions

Unless specified as "Fake", the currency note used is genuine

TABLE IV

| Currency Description | Side/Note | International Currency Notes (Polymer) Blue % | Red % | Yellow % |
|---|---|---|---|---|
| Country 1 | Side 1 (note 1, 2) | 14.55, 14.89 | 40.39, 40.03 | 45.06, 45.08 |
| | Side 2 (note 1, 2) | 14.78, 14.78 | 39.97, 40.61 | 45.25, 44.61 |
| Country 2 | Side 1 (note 1, 2) | 15.69, 15.71 | 41.11, 40.39 | 43.19, 43.9 |
| | Side 2 (note 1, 2) | 15.83, 15.67 | 41.94, 41.42 | 42.22, 42.92 |
| Country 3 | Side 1 (note 1, 2) | 15.83, 15.33 | 42.08, 42.54 | 42.08, 42.13 |
| | Side 2 (note 1, 2) | 16.49, 15.87 | 40.8, 41.19 | 42.71, 42.94 |

ADVANTAGES OF THE INVENTION

A system incorporates more than one technique of verifying the authenticity of a security document, namely technique based on reflecting property measurement.

A system based on the spatially integrated response of the photodetectors for at least three optical wave bands covering UV visible and near infra red spectrum in reflection.

A system capable of completely characterising a security document in terms of its spectral fluorescence and reflection properties.

A system where each currency is judged by reference signals pre-stored for its category with a unique code in terms of country of origin, denomination and series.

A system in which unique set of weights are pre-set to achieve a minimum false alarm rate independently for each currency code.

A system that can be used to authenticate both paper and polymer based security documents.

A system in which, based on measured reflection data, reference levels photoelectric signal indicating authenticity can be set independently for reflection corresponding to any security document from any country of any denomination.

The device provides the adjustment for two (lower and upper) signal values of reflection photodetectors, by suitable use of flash memory or other suitable firmware, the instrument can be factory or field set for any currency or document.

A system in which, based on the measured signals corresponding to reflection at least three wavebands covering UV visible spectrum and optionally covering ZUV-visible-near infra red spectrum, a single merit function can be defined to indicate authenticity.

A system capable of distinguishing a genuine security document, acquiring UV and infra red fluorescent properties similar to a fake one due to accidental application of detergent or otherwise, from a fake one.

A system capable of authenticating a soiled or mutilated genuine security document eliminating the effects of local perturbations using spatial integration technique.

A system eliminates the use of note transport mechanism or any other moving parts to scan a zone of a security document by using spatial integration technique over a large surface the area of the security document in reflection.

A system with the flexibility in the choice of optical band pass filters for fluorescence and reflection to take care of future security documents with new features added.

The device allows standard components of illumination and sensing without further sophisticated filters, which sense in a narrow band and require more signal amplification.

The device is suitable for various security documents and can be programmed for various countries of origin by storing the corresponding reference data and tagging those with a unique.

We claim:

1. A method for automatic discrimination of the authenticity of a document being one of currency notes, security instruments, security documents and similar documents complementing manual discrimination, said method comprising:

a) irradiating an inspection area of the document with a light source that emits radiation having wavelengths corresponding to UV visible electromagnetic waves and optionally near infrared electromagnetic waves;

b) acquiring reflected/fluoresced light from said inspection area of the document to generate a plurality of reflected/fluoresced signals; said document under inspection being held in a stationary condition; said reflected/fluoresced light having wavelengths corresponding to UV visible electromagnetic waves and optionally near infrared signals comprising at least 3 reflected/fluoresced signals $S_1$, $S_2$ and $S_3$, each of said three reflected/fluoresced signals being generated by a corresponding detector coupled to a band pass filter having different pass wave bands ($\lambda_1$, $\lambda_2$ and $\lambda_3$) being given by:

$$S_1=\iiint k_1(\lambda).\{r_{\lambda_1,x,y}(\lambda,x,y)/(x^2+y^2+z^2)\}d\lambda dxdy$$

$$S_2=\iiint k_2(\lambda).\{r_{\lambda_2,x,y}(\lambda,x,y)/(x^2+y^2+z^2)\}d\lambda dxdy$$

$$S_3=\iiint k_3(\lambda).\{r_{\lambda_3,x,y}(\lambda,x,y)/(x^2+y^2+z^2)\}d\lambda dxdy$$

where spatial integration is taken over the surface area of the document of interest and wavelength domain integration is taken over the wave band of interest, where_k(λ): a wavelength dependent constant of proportionality indicating energy conversion efficiency of the photodetector and filter combination, where $r_{\lambda 1,x,y}$, $r_{\lambda 2,x,y}$ and $r_{\lambda 3,x,y}$: average value of reflectance corresponding to the three optical filters at corresponding wavelengths at x, y, where b(λ,x,y): incident energy depends upon the source type and its location; and where x,y: coordinates of the centre point of an elementary area taking the foot of the normal drawn from the detector surface to the plane of the document under authentication as the origin z represents a vertical distance;

c) defining a set of dimensionless ratios using the at least 3 reflected/fluoresced signals $S_1$, $S_2$ and $S_3$ and calculating using a processor a measured dimensionless ratio value in respect of each of the said dimensionless ratios thus defined; and d) comparing, using the processor, each of the measured dimensionless ratio values with a predefined dimensionless ratio value to judge the authenticity of said documents.

2. A method as claimed in claim 1, wherein fluorescent and reflecting properties of currency notes, security instruments, security documents and similar documents under manual inspection in UV visible spectral range are used for first level authentication of the document.

3. A method as claimed in claim 1, wherein fluorescent and reflecting properties of currency notes, security instruments, security documents and similar documents under inspection in UV visible and near infra red spectral range are measured in at least three wave bands and are used for second level authentication of the document.

4. A method as claimed in claim 1, wherein fluorescent and reflecting properties of currency notes, security instruments, security documents and similar documents under inspection in UV visible and near infra red spectral range are measured in at least three wave bands and are used for authentication of the document.

5. A method as claimed in claim 1, wherein both reflected/fluoresced light flux from a said inspection area of the documents are spatially integrated during detection to generate data to be used to authenticate said documents.

6. A method as claimed in claim 1, wherein measured reflected signals in the pass wave bands are used to define a set of ratios and the defined ratios enable automatic authentication of documents.

7. A method as claimed in claim 1, wherein dimensionless ratio values for reflected/fluoresced data in the chosen wave bands respectively, correspond to the authentic currency notes, security instruments, security documents and similar documents are stored in system memory.

8. A method as claimed in claim 1, wherein dimensionless ratio values corresponding to various documents including the nature, type and country of origin are stored in system memory.

9. A method as claimed in claim 1, wherein different weights are given to each of the measured values and stored dimensionless ratio values for authentication of currency notes, security instruments, security documents and similar documents.

10. A method as claimed in claim 1, wherein a weight matrix having plural elements is used and the elements of the weight matrix are adjustable and are changed according to the nature, type and country of origin.

11. A method as claimed in claim 1, wherein software to make a judgment regarding authentication is resident in said system memory.

12. A method as claimed in claim 1, wherein the judging in step (d) is conducted by comparing weighted measured and stored dimensionless ratio values and priority can be assigned to any ratio corresponding to any wave band.

13. A method as claimed in claim 1, wherein the judging in step (d) is conducted by resident software together with stored weight matrices and a judgment regarding authentication is made based on majority of votes or pre-assigned priority vote or on any other preferential logic, each vote is in the form of genuine or fake derived by comparing each measured ratio with the corresponding stored value for each of the wave band chosen for reflection.

14. A method as claimed in claim 1, wherein spatial integration over a large area reduces the effect of aberrations and or variations in reflected data received from different areas of the security documents, bank instruments and other types of documents caused by local conditions.

15. A method as claimed in claim 1, wherein polymer based security documents as well as paper security documents can be authenticated.

16. A system for both manual and automatic discrimination of the authenticity of security instruments and security documents, said system comprising:

a suitably located UV visible radiation emitting fluorescent tube light or equivalent source and an optional compact near infra red (NIR) source such that either the UV visible source or both sources can be switched on simultaneously;

a set of sensor heads, each incorporating at least three photodetectors, each photodetector fitted with a broad band pass optical filter, covering different wave bands, all the filter-photodetectors in combination covering entire UV-visible-near ER spectrum, the sensor head being so positioned that it receives and measures the reflected/fluoresced energy from a large area of large security instruments and security documents and from the total area of smaller security instruments and security documents in at least three wave bands;

signal conditioning hardware and software, comprising a microcontroller to process and normalise sensors data, store in electronic memory or compare the measured data with the reference data independently for each currency code and weight the various comparative results to detect the genuineness;

a display; an audio-visual alarm; appropriate slot for insertion of the security instrument or security document under inspection, all the above elements being enclosed in a closed box such that the system performance remains immune to the influence of ambient light; and wherein, the said system authenticates a security instrument or a security document by acquiring reflected/fluoresced data, integrated in space and time domain in at least three broad spectral wave bands covering UV visible and optionally NIR (Near Infra Red) part of spectrum, for reflection/fluorescence, collected from a large area of the security instrument or security document, which is kept in a stationary condition during authentication process by illuminating the security instrument or security document using the light from a single broad band source with a provision to use an additional near infra red (NIR) source to provide reflected/fluorescence data in the NIR region together with reflected data in UV visible region, and by using the measured reflected/fluoresced signals to define a set of ratios and by comparing these ratios with the corresponding stored reference values to judge authenticity of the security instrument or security document under verification;

wherein the sensor head for reflection measurement is kept at least 125 mm from the security instrument or security document under verification so that sufficient light from the half or total surface area, depending upon the size of the security instrument or security document under verification, reaches the photodetector-filter combination so that each photodetector measures spatially and temporally integrated reflected light flux in the preferred optical wave band by performing the following integrations in space and time domain and deriving electrical signals corresponding to the optical wave band selected by the photo detector-filter combination:

$$S=\iiint k(\lambda).\{r_{\lambda,x,y}(\lambda,x,y)/(x^2+y^2+z^2)\}d\lambda dxdy$$

wherein, spatial integration is taken over the surface area of the security instrument or security document of interest and wave length domain integration is taken over the wave band of interest, and where, $k(\lambda)$: a wavelength dependent constant of proportionality indicating energy conversion efficiency of the photodetector and filter combination $r_{\lambda,x,y}$: reflectance corresponding to wavelength at x, y $b(\lambda,x,y)$: incident energy depends upon the source type and its location x,y: coordinates of the centre point of the elementary area taking the foot of the normal drawn from the detector surface to the plane of security instrument or security document under authentication as the origin z represents a vertical distance.

17. A system as in claim 16, wherein two level authentication can be achieved for a security document, said document including paper based currency notes, polymer based currency notes, passports, visas, security bonds of different types and bank instruments.

18. A system as claimed in claim 16, where in the system comprises of a broad band UV visible tube light source for both visual and automatic inspection, an optional compact near infra red (NIR) source, a sensor head containing at least three closely spaced photodetectors and optical filter combination, a ground glass plate to hold the security instrument or security document under inspection in position, signal processing electronics, electronic memory to store data, electronic devices to implement logical decisions based on the comparison of data acquired and stored data to indicate authentication or a counterfeit note and necessary software/firmware enclosed in said closed box to cut off ambient light; LEDs and audio alarm speaker for audio visual display.

19. A system as claimed in claim 16, wherein separate chambers are provided for both visual as well as automatic authentication.

20. A system as claimed in claim 16, wherein the system is made insensitive to short-term thermal drifts, ageing effects and accumulation of dust by incorporating a single source and multiple photodetectors to normalise responses.

21. A system as claimed in claim 16, wherein multiple photodetectors are used and an optical wave band filter is combined with each photodetector so that each photodetector-filter combination measures energy corresponding to a preferred wave band.

22. A system as claimed in claim 16, wherein three different wave band filters are used for reflection measurements such that together these cover UV visible and near infra red part of spectrum.

23. A system as claimed in claim 16, wherein a security instrument or security document is placed manually in a narrow spacing provided by the parallel glass plate made of BK7 or equivalent optical glass.

24. A system as claimed in claim 16, wherein a glass plate is incorporated with the upper surface of the upper glass ground.

25. A system as claimed in claim 16, wherein a ground glass plate is used to achieve better spatial integration of light, to minimize the contribution of local area perturbation in the security instrument or security document, to eliminate back specular reflection from the ground glass plate and to remove wrinkles of the security instrument or security document during authentication.

26. A system as claimed in claim 16, wherein the ground glass plates are fixed at such a location that the sandwiched security instrument or security document, between the floor and the glass plate, under inspection in the closed chamber is evenly illuminated throughout and all the photodetector-filter combinations collect reflected light from a large area of the security instrument or security document under inspection, if the document is of large size otherwise from the total surface when the document is of small size.

27. A system as claimed in claim 16, wherein each of the reflection measuring closely spaced photodetector-filter combination in Sensor Heads (SH) receives light flux from the area if the document is of large size or from the entire surface if the document is small size by placing the document in a fixed suggested orientation.

28. A system as claimed in claim 16, wherein the light source is placed at a distance of at least 150 mm from the upper surface of the security instrument or security document under verification so that the entire area of the said document is brightly and uniformly illuminated.

29. A system as claimed in claim 16, wherein responses of genuine security instruments or security documents of various types or country of origin are stored in the system memory, triggering an audio alarm when the security instrument or security document is a counterfeit note.

30. A system as claimed in claim 16, wherein measured electrical signals of reflected energy by the photodetector-filter combinations in the chosen optical wavebands are used to form a set of weighted ratios which are compared with the corresponding reference stored values to verify authenticity of a security instrument or security document following the under mentioned operations sequentially:

a) acquiring signals from all photodetectors without any document present and stores, this “no document condition”;

b) comparing the acquired signals with the corresponding stored values of “no document condition”;

c) if the signals vary beyond threshold values of corresponding stored values of “no document condition”, the system halts and the display reads “Ready” and the system is kept in off state indicating component failure;

d) when the acquired signals from the security instrument or security document are within acceptable limit as explained at above, the ‘Ready’ display is switched on indicating the may operator may insert the security instrument or security document to be authenticated;

e) after said document is inserted, the operator manually selects a sensitivity level, keys a document dependant code and inserts the security instrument or security document under authentication, the acquired reflected signals corresponding to the preferred optical wave bands are suitably normalised, the code describes the nature and type of document and a database of codes are pre-stored, in case where no sensitivity level or code are selected the last entered values are taken as default;

f) these normalised values are compared with the reference values pre-stored for the particular currency under examination and thus a number of binary results are obtained;

g) the binary results obtained are then multiplied by a set of stored pre-assigned weights corresponding to the currency code;

h) the sum of the weighted values is assigned a score and depending upon the selected sensitivity level the computed score is used to make decision regarding authenticity and the results displayed by making the “PASS” LED glow indicating the document is genuine or making the “FAKE” LED glow simultaneously.

31. A system as claimed in claim 16, wherein flash memory or other suitable firmware is used to store all reference values and to meet the calibration requirements in a factory or field level.

32. A system as claimed in claim 16, wherein responses from all the photodetector-filter combinations are used to make a judgment regarding authenticity automatically.

33. A system as claimed in claim 16, wherein the firmware selects the acceptable signal level(s) of reflection for the security instrument or security document under inspection for accurate authentication.

34. A system as claimed in claim 16, wherein authentication is obtained by placing the security instrument or security document under authentication between the glass plate through a narrow slit in a dark chamber such that photodetectors do not receive any ambient and stray light from the outside of the dark chamber.

35. A system as claimed in claim 16, wherein said system is useful for detecting genuineness of a plurality of denominations, series and currencies from different countries.

36. A system as claimed in claim 16, wherein said system is useful for detecting genuineness of security instruments or security documents, which may or may not have a fluorescence emission feature.

37. A system as claimed in claim 16, wherein said system is useful for detecting genuineness of security instruments or security documents having reflective, fluorescence properties.

38. A system as claimed in claim 16, wherein unique detection of genuineness is possible by stored references for the pre-specified security instruments or security documents.

39. A system as claimed in claim 16, wherein multiple levels of judgment regarding authenticity is possible based on measured reflection/fluorescence properties of a security instruments or security document by at least three photodetector-filter combinations responses in different optical wavebands.

40. A system as claimed in claim 16, wherein standard photodetectors covering a range of 350 nm 1100 nm are used.

* * * * *